(12) United States Patent
Bookland et al.

(10) Patent No.: US 10,716,455 B1
(45) Date of Patent: Jul. 21, 2020

(54) BIO-RENEWABLE FLOOR MATS

(71) Applicant: Purus International, Inc., Indio, CA (US)

(72) Inventors: Eric Bookland, Indio, CA (US); Dennis Baldwin, Indio, CA (US)

(73) Assignee: Purus International, Inc., Indio, CA (US)

( * ) Notice: Subject to any disclaimer, the term of this patent is extended or adjusted under 35 U.S.C. 154(b) by 41 days.

(21) Appl. No.: 15/887,755

(22) Filed: Feb. 2, 2018

Related U.S. Application Data

(60) Provisional application No. 62/454,650, filed on Feb. 3, 2017.

(51) Int. Cl.
| | |
|---|---|
| *A47L 23/26* | (2006.01) |
| *B32B 7/12* | (2006.01) |
| *B32B 27/08* | (2006.01) |
| *B29C 48/08* | (2019.01) |
| *B29C 48/21* | (2019.01) |
| *B32B 27/32* | (2006.01) |
| *B32B 27/20* | (2006.01) |
| *B32B 7/06* | (2019.01) |
| *B29L 31/00* | (2006.01) |
| *B29K 23/00* | (2006.01) |
| *B29K 505/12* | (2006.01) |

(52) U.S. Cl.
CPC .......... *A47L 23/266* (2013.01); *B29C 48/08* (2019.02); *B29C 48/21* (2019.02); *B32B 7/06* (2013.01); *B32B 7/12* (2013.01); *B32B 27/08* (2013.01); *B32B 27/20* (2013.01); *B32B 27/32* (2013.01); *B29K 2003/00* (2013.01); *B29K 2023/0633* (2013.01); *B29K 2505/12* (2013.01); *B29L 2031/7324* (2013.01); *B32B 2264/105* (2013.01); *B32B 2471/04* (2013.01)

(58) Field of Classification Search
CPC . A47L 23/266; B29C 47/0021; B29C 47/065; B32B 7/06; B32B 7/12; B32B 27/08; B32B 27/20; B32B 27/32; B32B 2264/105; B32B 2471/04; B29K 2003/00; B29K 2023/0633; B29K 2505/12; B29L 2031/7324
See application file for complete search history.

(56) References Cited

U.S. PATENT DOCUMENTS

| | | | | |
|---|---|---|---|---|
| 3,501,797 | A | * | 3/1970 | Nappi ................. A47L 23/266 15/104.002 |
| 3,867,324 | A | * | 2/1975 | Clendinning .......... A01C 1/046 523/126 |

(Continued)

*Primary Examiner* — Patricia L. Nordmeyer
(74) *Attorney, Agent, or Firm* — Rutan & Tucker, LLP

(57) ABSTRACT

Apparatus and methods for improved composition of floor coverings, utilizing bio-renewable materials, is disclosed. Floor coverings, or tacky mats, may be used in cleanroom environments to capture particulate matter from foot and equipment traffic. Bio-renewable materials may include thermoplastic starch (TPS) blends made from sustainable raw materials such as corn, tapioca, or the like. These bio-renewable materials may be blended and coextruded with synthetic or petro-based polymers. This reduces the environmental impact on production and disposal of the floor mat, while maintaining the physical and mechanical properties demonstrated by pure synthetic polymers.

17 Claims, 7 Drawing Sheets

(56) References Cited

U.S. PATENT DOCUMENTS

| | | | | |
|---|---|---|---|---|
| 5,922,379 | A | * | 7/1999 | Wang ........................ A23J 3/26 |
| | | | | 106/162.5 |
| 6,001,471 | A | * | 12/1999 | Bries ....................... A47G 1/175 |
| | | | | 428/343 |
| 2004/0261209 | A1 | * | 12/2004 | McKay ................. A47L 23/266 |
| | | | | 15/215 |
| 2007/0020424 | A1 | * | 1/2007 | Gruenbacher ........ A47L 23/266 |
| | | | | 428/40.1 |
| 2007/0020432 | A1 | * | 1/2007 | Gruenbacher ........ A47L 23/266 |
| | | | | 428/136 |
| 2007/0020433 | A1 | * | 1/2007 | Gruenbacher ........ A47L 23/266 |
| | | | | 428/137 |
| 2010/0075129 | A1 | * | 3/2010 | Nagasaki .................... C09J 5/06 |
| | | | | 428/313.3 |
| 2011/0305886 | A1 | * | 12/2011 | Phan ........................ B32B 9/02 |
| | | | | 428/201 |
| 2012/0148778 | A1 | * | 6/2012 | Dawkins .............. A43B 17/102 |
| | | | | 428/40.1 |
| 2013/0040099 | A1 | * | 2/2013 | Prewett ..................... B32B 3/02 |
| | | | | 428/119 |
| 2015/0299432 | A1 | * | 10/2015 | Scheirs .................. C08K 5/098 |
| | | | | 523/128 |

* cited by examiner

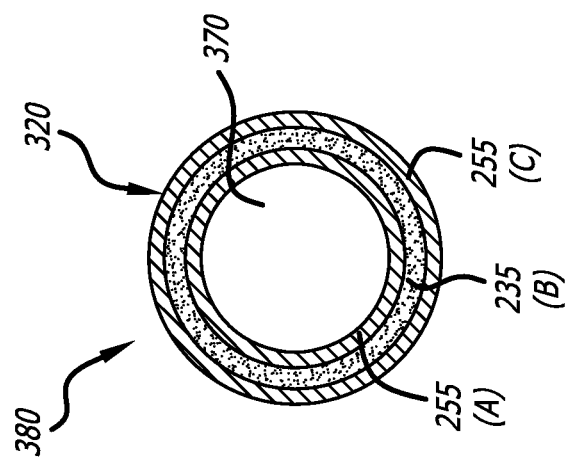
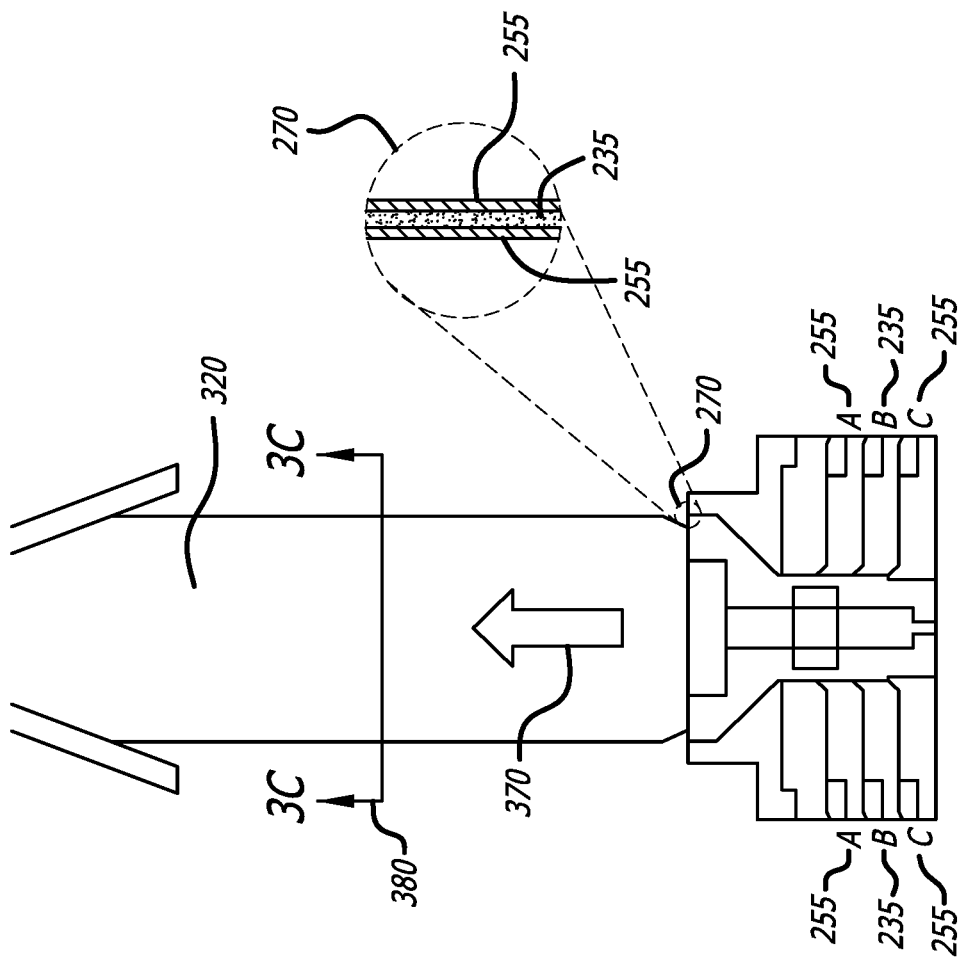

BIO-RENEWABLE FLOOR MATS

CROSS-REFERENCE TO RELATED APPLICATIONS

This application claims the benefit of priority on U.S. Provisional Patent Application No. 62/454,650 filed Feb. 3, 2017, the entire contents of which are incorporated by reference herein.

FIELD

Embodiments of the disclosure relate to the field of bio-renewable floor mats. More specifically, an aspect of the invention relates to an apparatus and methods for improved composition of the floor mats, utilizing bio-renewable materials.

GENERAL BACKGROUND

Contamination control mats, commonly referred as "tacky mats," are utilized in environments such as medical, nuclear, semiconductor chip manufacturing applications, waste removal applications such as asbestos abatement, construction sites, or the like. These mats are placed on the floors, such as in entry ways or exits, to capture particulate matter such as dirt, dust and other contaminants.

Typically these mats are composed of non-renewable plastic sheets that are layered in a stack. Each sheet is coated on an upper side with a thin layer of adhesive that adheres to the smooth surface of the sheet above it. Protective liners cover the top and bottom sheets of the mat until it is ready for use. When the protective liners are removed, the mat may be adhered in position and the adhesive on the top most sheet of the mat is exposed. The adhesive of the upper most sheet adheres to, and removes, any lose particulate matter from foot traffic and equipment that engages the mat. However, no adhesive is transferred to the shoe or equipment. When the top-most sheet becomes contaminated, the sheet is removed and disposed.

Tacky mat sheets are difficult to recycle due to the adhesive and the particulate contamination disposed thereon. Accordingly, since most recycling facilities cannot process the disposed sheets, the contaminated sheet are put with common waste. With sunlight, the plastic sheets can take hundreds of years to break down resulting in dangerous micro plastics. If placed in a landfill, the sheets could remain intact indefinitely.

What is needed are apparatus and methods for creating floor mats, or coverings, which include bio-renewable materials. These floor mats have improved environmental costs by reducing the carbon footprint of production. These floor mats also improve the environmental impact of disposal by releasing less micro plastics, and other harmful materials, into the environment. Further these materials may also improve the oxo-degradability or bio-degradability of the discarded floor mats.

BRIEF DESCRIPTION OF THE DRAWINGS

Embodiments of the disclosure are illustrated by way of example and not by way of limitation in the figures of the accompanying drawings, in which like references indicate similar elements and in which:

FIGS. 3A-C are an exemplary apparatus and method for creating a film that includes a bio-renewable material.

DETAILED DESCRIPTION

Various embodiments of the disclosure are directed to the use of bio-renewable materials during the construction of a floor covering (e.g., a floor mat). Bio-renewable materials may include thermoplastic starch (TPS) blends made from bio-renewable, sustainable raw materials such as corn, tapioca, or the like. While a number of techniques have been developed to improve the physical and mechanical properties of native starch, the resulting polymers typically still have poor physical and mechanical properties when compared to synthetic counterparts. In an embodiment of the present disclosure, bio-renewable materials may be blended with synthetic or petro-based polymers to create a floor mat. By utilizing a proportion of bio-renewable material in the construction of the floor mat, the overall environmental impact of the floor mat is reduced while maintaining the physical and mechanical properties demonstrated by synthetic counterparts.

Various embodiments of the disclosure use an apparatus and method of co-extrusion that improves the bio-renewable properties of a polymer film while maintaining the physical and mechanical properties of synthetic, non-renewably sourced plastics. These apparatus and methods may then be used to produce various components of a floor mat.

Terminology

In the following description, certain terminology is used to describe aspects of the invention. In other instances, specific numeric references such as "a first extruder," may be made. However, the specific numeric reference should not be interpreted as a literal sequential order but rather interpreted that the "first extruder" is different than a "second extruder." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein. Lastly, in certain situations the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Bio-Renewable Floor Mat

Figure 1:
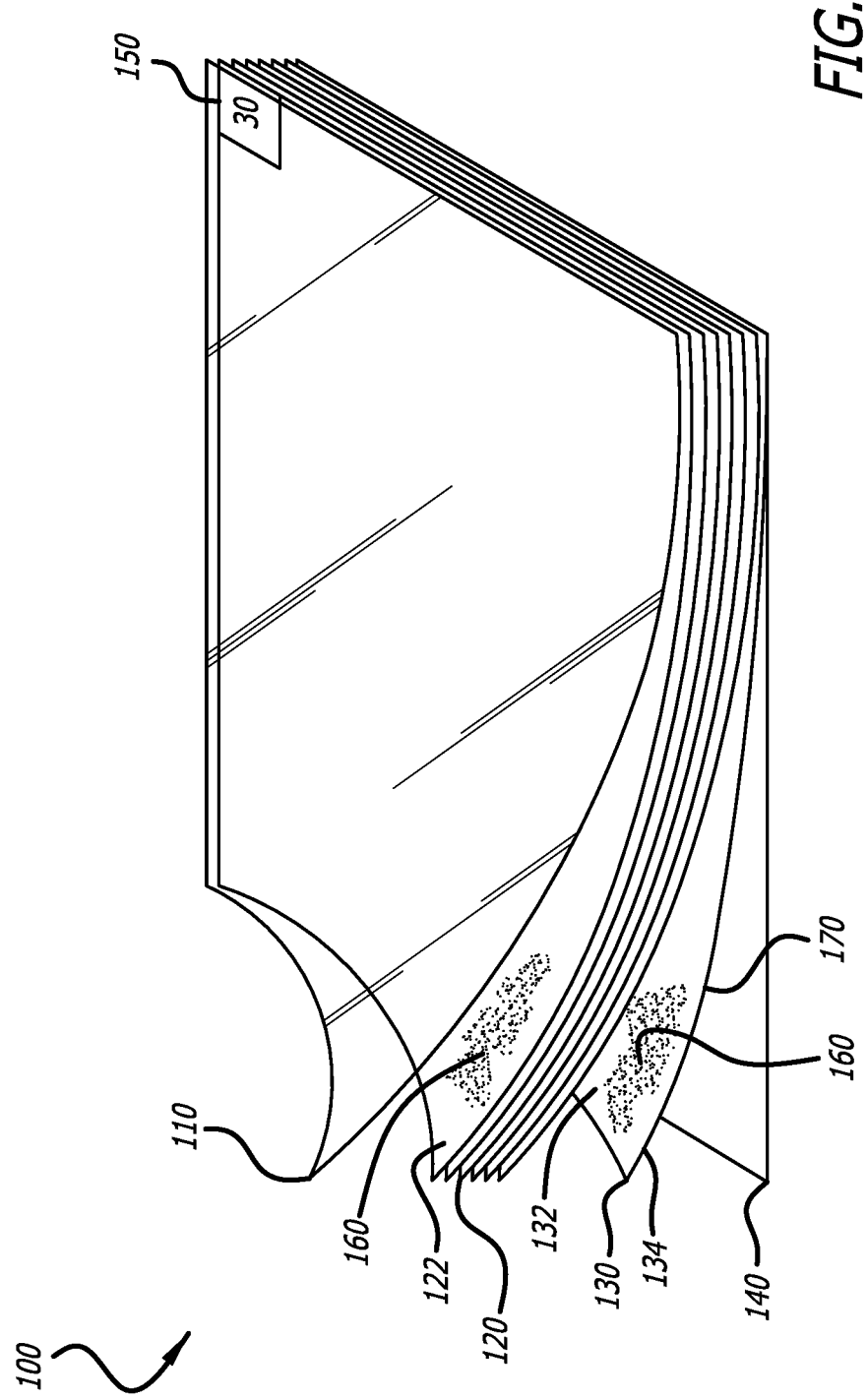
FIG. 1 is an exemplary apparatus of a floor mat including a top protective liner, a plurality of upper layers each including a detachment device, a base layer, and a bottom backing layer.

Referring to FIG. 1, an exemplary apparatus of a floor covering (e.g., a floor mat) 100 is shown. The floor mat 100 may feature a plurality of sheets, including top protective liner 110, a plurality of upper layers 120, a base layer 130, and a backing layer 140. At least one of the top protective liner 110, plurality of upper layers 120, base layer 130, and backing layer 140 may be formed of a bio-renewable material or of a polymer film which includes a bio-renewable material. According to one embodiment of the disclosure, the length and width of the floor mat may range between 18-36 inches, with a thickness ranging between 3-5 millimeters (mm), although it will be appreciated that other sizes, dimensions and shapes of the floor coverings may fall within the scope of the invention.

Herein, exemplary bio-renewable materials may include, but are not limited or restricted to thermoplastic starch (TPS), TPS blends, or commercially available bio-renewable, bio-degradable, or oxo-degradable products, or any combinations thereof. Exemplary commercially available bio-renewable, bio-degradable, or oxo-degradable products may include Cardia Biohybrid™ BL-F, Cardia Biohybrid™ BL-M, Cardia Compostable™ B-F, Cardia Compostable™ B-M, Cardia Biohybrid™ H-F, and the like. Exemplary TPS, or TPS blends, may include, but is not limited or restricted to, starch, bio-degradable polyesters, natural plasticizers, glycerol, sorbitol, essential amino acids (EAA), Polypropylene (PP), Polyethylene (PE), Polystyrene (PS), Polyvinyl chloride (PVC) Polyburate (PBAT), Polylactic acid (PLA), or combinations thereof. Exemplary bio-renewable materials are discussed more detail in International Application No. PCT/AU2007/001027, filed Jul. 24, 2007, which is herein incorporated by reference. Furthermore, according to an embodiment of the disclosure, the bio-renewable material may also include additives to enhance the oxo-degradablility or bio-degradability of the bio-renewable material. Such additives may comprise at least 1% of the bio-renewable material with a preferred embodiment comprising approximately 2% of the bio-renewable material. Exemplary additives may include, but not limited to, polyolefin that includes catalytic additives such as cobalt (Co), magnesium (Mg), manganese (Mn), zinc (Zn), iron (Fe), nickel (Ni), or the like.

As illustrated in FIG. 1, a top surface 132 of the base layer 130 and a top surface 122 of each of the plurality of upper layers 120 may include a first adhesive 160 disposed thereon. This first adhesive 160 may be applied as a coating or layer that is disposed partially or entirety over the top surface 132 of the base layer 130, over the top surface 122 of each of the plurality of upper layers 120, or combinations thereof. For this embodiment, the base layer 130 may include a second adhesive 170. The second adhesive 170 may be an industrial strength adhesive, which is disposed over the entire (or on a selected portion) of a bottom surface 134 of the base layer 130 and possesses a certain degree of tackiness (referred to as a "tack level"). The tack level of the second adhesive 170 is greater than the tack level of the first adhesive 160. According to one embodiment of the disclosure, the second adhesive 170 may have a tack level that is at least double the tack level of the first adhesive 160. Each of the first and second adhesives 160 and 170 may include a non-permanent, water-based, acrylic adhesive. However, it will be appreciated that other adhesives, such as solvent based or rubber based adhesives for example, may be utilized as either the first or second adhesive.

Each of the upper layers of the plurality of upper layers 120 may include a detachment device 150. Further, the protective liner 110 and backing layer 140 may also include a detachment device 150. The detachment device 150 may include a string, a tab, a label, or similar structure that facilitates the removal of a sheet from the floor mat 100, for example, a topmost upper layer from the plurality of upper layers 120. In an embodiment, the detachment device 150 may include a label disposed adjacent a corner of each of the plurality of upper layers 120 with consecutive labels disposed immediately below and substantially aligned with each another. However, it will be appreciated that other combinations of detachment devices and positions thereof fall within the scope of the present invention.

In an embodiment, the detachment device 150 may include a symbol, for example, an alphanumeric symbol. The symbols of consecutive detachment devices may be arranged in either increasing or decreasing order as individual layers of the plurality of upper layers are removed. By way of a non-limiting example, the symbol may include a number which indicates how many layers of the plurality of upper layers 120 remain. This, advantageously indicates to a user how many layers are left before the floor mat needs to be replaced.

Figure 2:
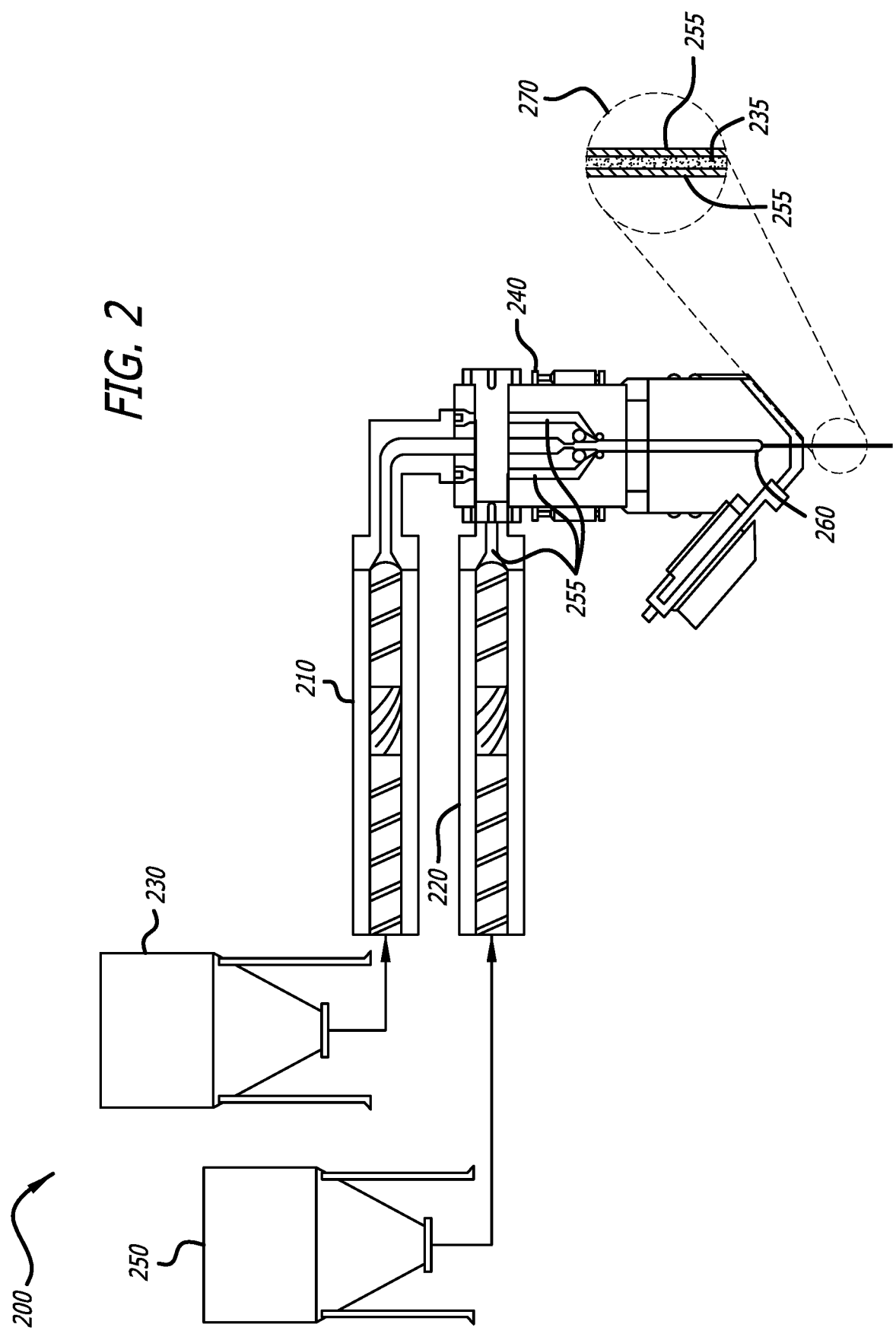
FIG. 2 is an exemplary apparatus and method for coextruding a resin that includes a bio-renewable material.

Referring to FIG. 2, an exemplary extrusion system and method of forming a polymer coextrusion which includes a bio-renewable material, is shown. The system 200 includes a first extruder 210 and a second extruder 220. The first extruder 210 receives a mixture of pellets of a synthetic polymer and pellets of a bio-renewable material 232 from a storage device 230. In an embodiment, the percentage ratio of bio-renewable material pellets included with a synthetic polymer, which is fed into extruder 210, may be between 1% and 100%. In a preferred embodiment, the percentage ratio of bio-renewable material pellets may range between 20-40%. The pellet mixture 232 is heated until a first melting point temperature is reached to create a resin 235. In an embodiment, a first melting point temperature is between 150° C. and 220° C. In a preferred embodiment, a first melting point temperature is between 160° C. and 200° C. This resin is then extruded to the coextrusion feedblock 240.

In an embodiment, the pellets of synthetic polymer included in storage device 250 may be polyethylene, polypropylene, or similar polyolefin. In a preferred embodiment the synthetic polymer is Low Density Polyethylene (LDPE). Although it will be appreciated that other polymers with similar mechanical and physical properties to LDPE may be used and fall within scope of the present invention.

In an embodiment, the second extruder 220 receives pellets of a synthetic polymer 252 only via the storage device 250. These pellets 252 are then heated to a second melting point temperature and extruded to create a stream of extruded synthetic polymer 255. In an embodiment, a second melting point temperature is between 100° C. and 190° C. In a preferred embodiment, a second melting point temperature is between 115° C. and 135° C. The extruded polymer is then fed into the coextrusion feedblock 240. It will be appreciated that the specific temperatures required to melt the bio-renewable material or LDPE pellets 232 and 252 may vary depending on the material, or blend of material, being used.

The coextrusion feedblock 240 receives the streams of extruded resin 235 and extruded synthetic polymer 255 and delivers a steady volumetric throughput of different viscous polymers to a single extrusion head 260. The extrusion head 260 may extrude the materials in the desired form. In an embodiment, a layer of resin 235 may be extruded between two layers of synthetic polymer 255. As a result, a layered coextrusion 270 of polymer and bio-renewable material is produced. The layer thicknesses may be controlled by the relative speeds and sizes of the individual extruders delivering the materials. In an embodiment of the disclosure, the ratios of resin 235 to synthetic polymer 255 in the coextruded polymer 270 may be between 25% and 75%, with a preferred ratio of 50%.

The coextruded polymer 270 advantageously has a portion thereof (resin 235) formed of a bio-renewable material which reduces the production carbon footprint. This also reduces the amount of harmful synthetic polymers that are released into the environment when disposed. The addition of the bio-renewable material may also improve the oxo-degradability or bio-degradability of the resulting products. Advantageously, the coextruded polymer 270 maintains the mechanical, physical, and operational characteristics of pure synthetic polymer 255, including being able to be recycled in the same manner as the pure synthetic polymer 255.

Figure 3A:
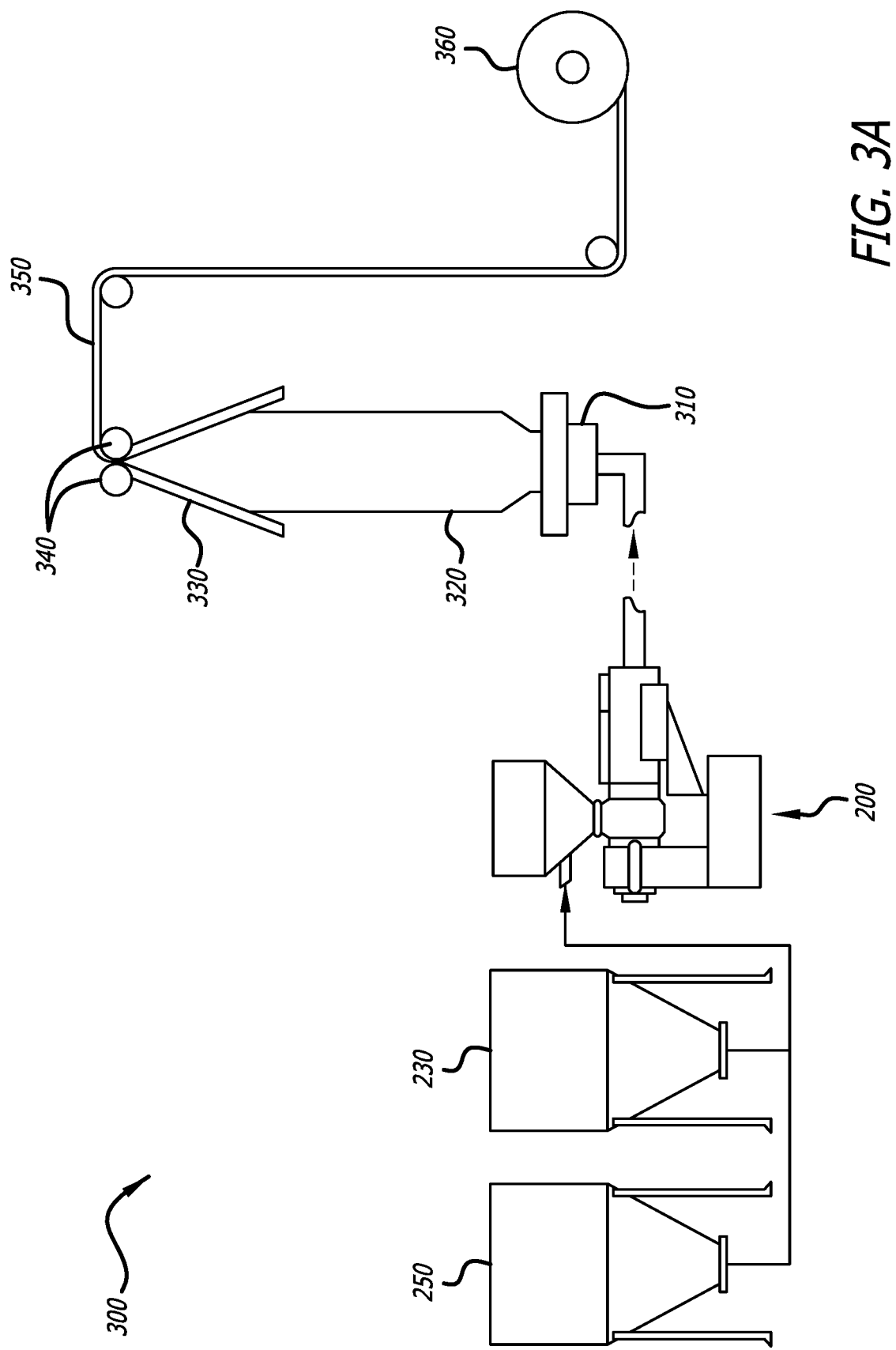

Referring to FIGS. 3A-C, a more detailed illustration of a system 300 used in the formation forming a polymer film operating as a core component of one or more of bio-renewable-based upper layers and/or base layer of the floor mat 100 of FIG. 1 is shown. The coextrusion of LDPE and bio-renewable, as described herein in relation to FIG. 2 is fed into a die 310. In an embodiment, die 310 may be a three-layer die that creates a cylindrical tri-layer flow of coextrusion. As best seen in FIGS. 3B-3C, a cross-section of the die 310 may form three annular rings or layers. Polymer 255 may be fed into the outer most annular ring (A) and the inner most annular ring (C). Resin 235 may be fed into the middle annular ring. The die 310 may then feed air 370 into the space created by the annular rings of coextrusion to create a coextrusion bubble 320. To further illustrate the structure of the coextrusion bubble 320, FIG. 3C shows a cross-sectional view of bubble 320 at position 380 showing the outer annular ring or layer (A) of polymer 255, middle annular ring or layer (B) of resin 235, and inner annular ring or layer (C) of polymer 255. The coextrusion bubble 320 allows the coextruded polymer 270 to achieve the correct thickness as well as to cool to a temperature that is conducive to formulation of the film. The coextrusion bubble 320 is then fed into a collapsing frame 330 and nip rollers 340, which collapses and cuts the coextrusion bubble 320 into a planar sheet of film 350 (hereinafter, "coextruded film"). The coextruded film 350 may be compressed by rollers 340 to remove any air pockets and achieve a desired thickness. In an embodiment of the disclosure, the coextruded film 350 may have a thickness ranging between 0.5 mil.-2.0 mil., with a preferred embodiment having a thickness of approximately 1.0 mil. In an embodiment, the coextruded film 350 may be subject to further processing to achieve a preferred thickness, density or other desirable characteristics. The coextruded film 350 may then be collected as a roll 360. The width of the roll 360 may range between 24 inches and 60 inches with preferred embodiments having a width of 36 inches, 48 inches, or 54 inches.

Figure 4:
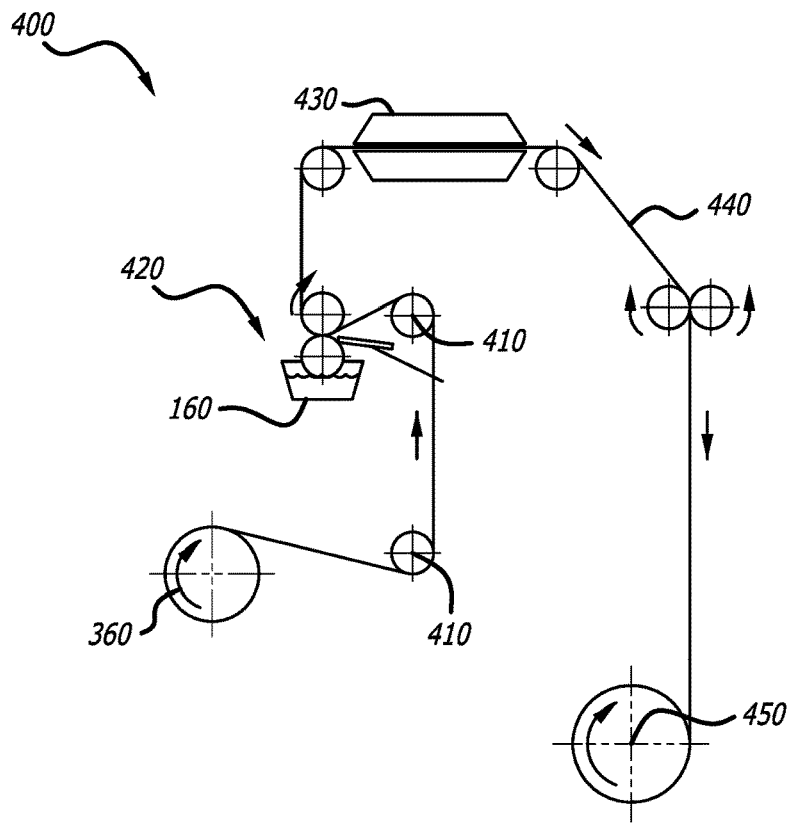
FIG. 4 is an exemplary apparatus and method for applying a first adhesive layer to a bio-renewable film.

Referring to FIG. 4, an exemplary system 400 for applying a first adhesive to the coextruded film 350 which includes polymer-surrounded bio-renewable material, is shown. The roll 360 of coextruded film 350 is fed, using through one or more rollers 410 for example, to an adhesive coating station 420. At the adhesive coating station 420, an adhesive is applied to one side (i.e., top surface) of the coextruded film 350. In an embodiment of the disclosure, the adhesive 160 is applied as a layer less than or equal to 0.3 mil. in thickness. As previously mentioned, in an embodiment the adhesive 160 may be a water based acrylic adhesive, although other adhesives may fall within the scope of the invention. Once the first adhesive 160 is applied, the coextruded film 350 (with the first adhesive 160 applied thereto) is passed through a drying tunnel 430 to produce a single-sided adhesive film 440. The single-sided adhesive film 440 is fed onto a roll 450. The roll 450 of single-sided adhesive film 440 may be used to create the plurality of upper layers 120 of FIG. 1.

Figure 5:
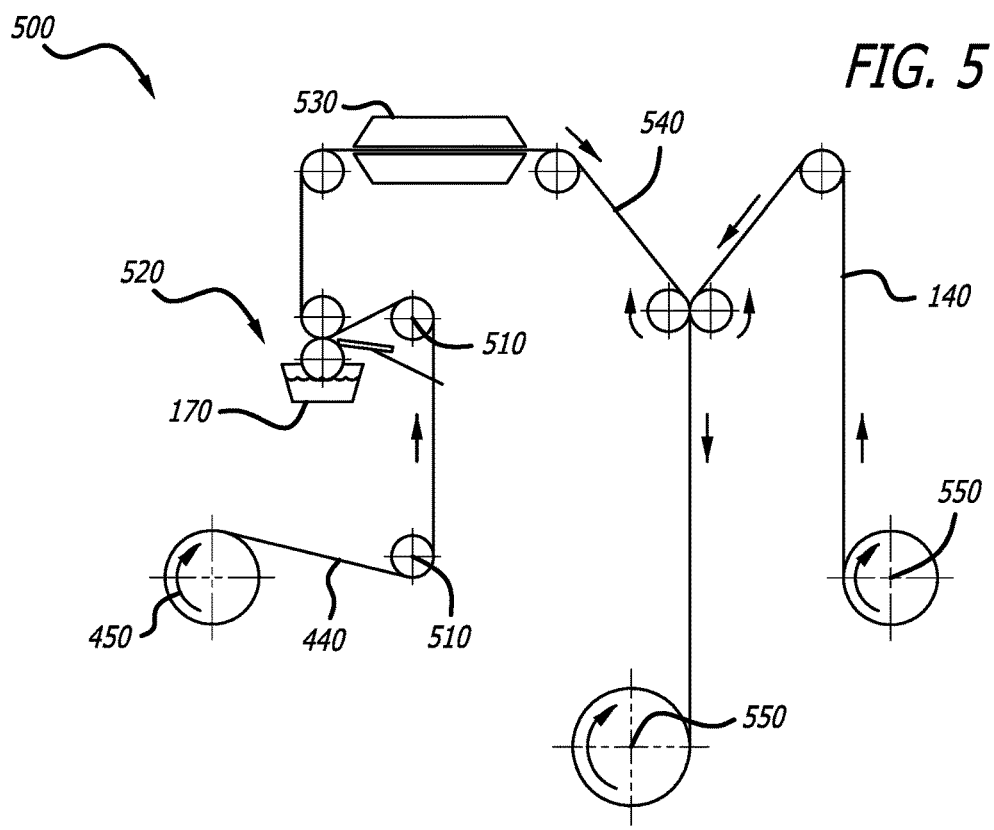
FIG. 5 is an exemplary apparatus and method for applying a second adhesive layer to a bio-renewable film.

Referring to FIG. 5, an exemplary system 500 for applying a second adhesive to the single-sided adhesive film 440 including the bio-renewable material is shown. The roll 450 of single-side adhesive (coextruded) film 440 may be fed through a series of rollers 510 to an adhesive coating station 520. Herein, a second adhesive 170 is applied to the other side (i.e., bottom surface) of the film 440. In an embodiment of the disclosure, the adhesive 170 is applied as a layer less than or equal to 0.3 mil. in thickness. As previously mentioned, for this embodiment, the second adhesive 170 may be a water based acrylic adhesive, although other adhesives may fall within the scope of the present invention. Further, the second adhesive 170 has a tack level that is at least double the tack level of the first adhesive 160. More specifically, the tack level of the first adhesive 160 may be between 100 grams and 300 grams with a preferred embodiment having a tack level of approximately 190 grams+/−40 grams. In an embodiment the tack level of the second adhesive 170 may be between 300 grams and 700 grams with a preferred embodiment having a tack level of approximately 550 grams+/−40 grams.

Once the second adhesive 170 is applied, the resulting film (with the second adhesive 170 applied thereto) is passed through a drying tunnel 530. Having passed through the drying tunnel 530, the double-sided adhesive film 540 is produced and a protective backing layer 140 is fed into the system 400 from a roll 550 and is applied to a side of the double-sided adhesive film 540 with the second adhesive 170. This protective backing layer 140 prevents the first adhesive 160 from sticking to the second adhesive as it is collected on to roll 560 and when deployed in a tacky mat construction. The roll 560 of double-sided adhesive film 560 may be used to create the base layer 130 with the protective backing layer 140 disposed on the bottom surface thereof.

Figure 6:
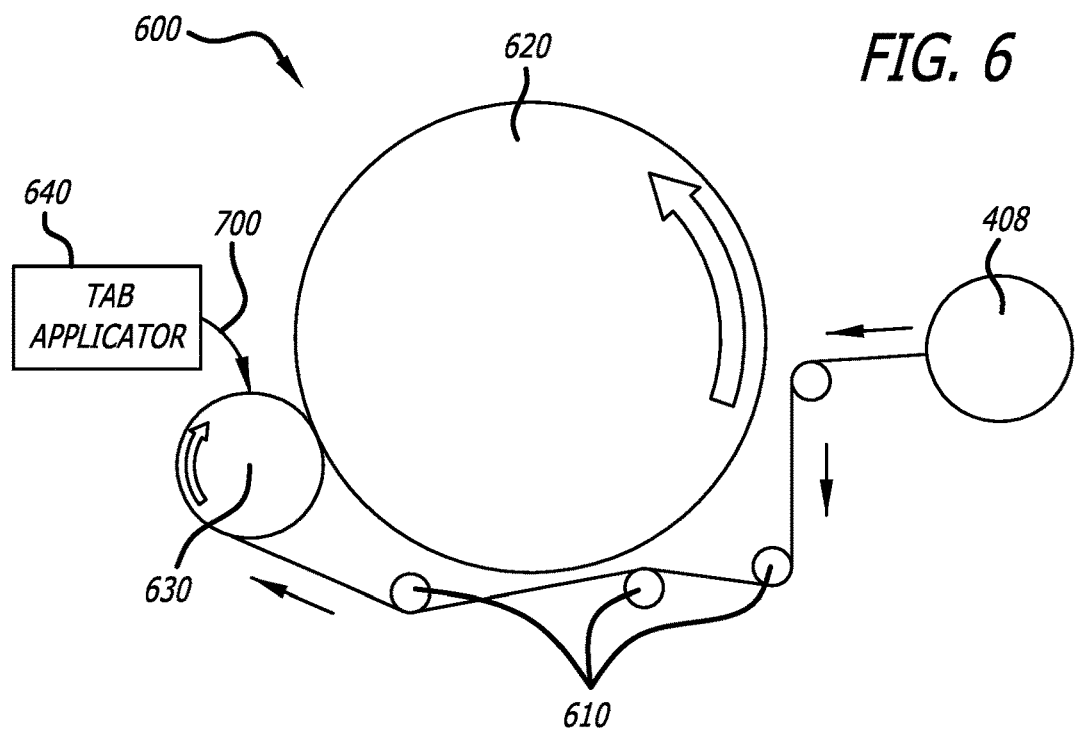
FIG. 6 is an exemplary apparatus and method of assembling a plurality of upper layers.

Referring now to FIG. 6, an exemplary system 600 for assembling the plurality of upper layers 120, is shown. Herein, the roll 450 of single-sided adhesive film 440 is fed through a series of rollers 610 on to a drum 620. With each rotation of drum 620 a new layer of an upper layer sheet is added until a "stack" of a plurality of upper layers is created. As shown, for this embodiment, a plurality of layers of the single-sided adhesive film 440 (e.g., 30-60 layers) are produced on the drum 620, although it will be appreciated that a greater or lesser numbers of layers may be produced. These layers of single-sided adhesive film 440 gathered on the drum 620 may produce a plurality of stacks of upper layer sheets, such as between 12 to 20 stacks depending on the dimensions of the floor mat to be produced.

As the single-sided adhesive film 440 is fed on to the drum 620, at an adjacent roller 630, a set of detachment devices 700 (e.g. tabs) may be applied to the film 440 using a tab applicator 640. Roller 630 ensures the removal of any wrinkles or air pockets as the single-sided adhesive film 440 is applied to the drum 620.

Figure 7:
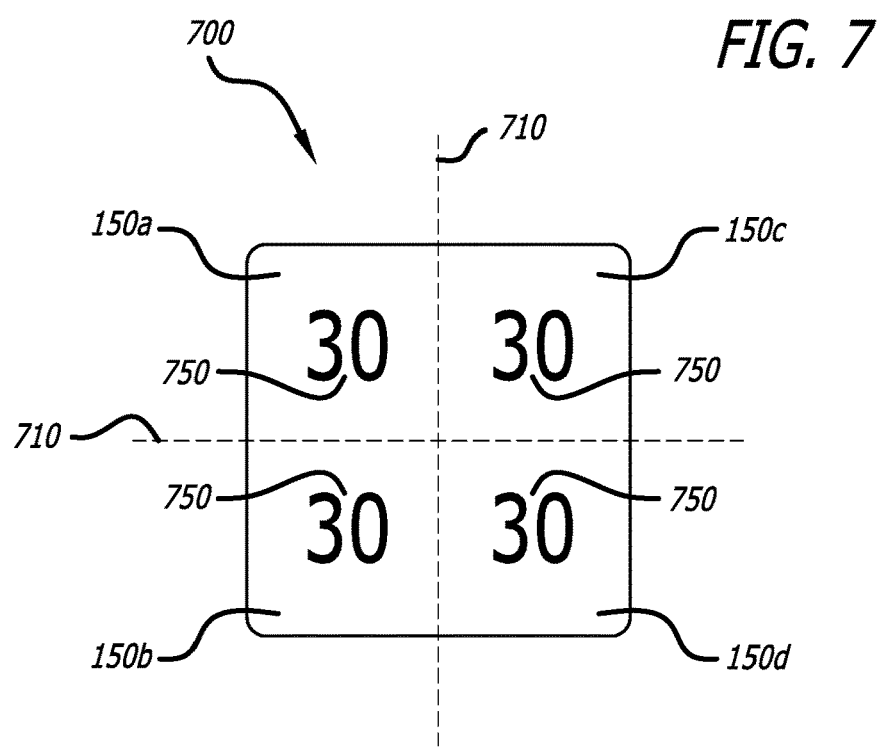
FIG. 7 is an exemplary apparatus of a detachment device that may be used with embodiments disclosed herein.

Referring to FIG. 7, an illustrative embodiment of the set of detachment devices 700 applied by the tab applicator 640 is shown. In an embodiment, the set of detachment devices 700 may include two or more labels, although other detachment structures are contemplated and fall within the scope of the present invention, as discussed herein. According to one embodiment of the disclosure, the set of detachment devices 700 includes four labels 150*a-d*. The label set 700 may be applied to the single-sided adhesive film 440 in such a way as to span the corners of 4 separate floor coverings 100 at different corner locations. Accordingly, when the floor coverings 100 are cut to size, for example, along dashed lines 710, each of label 150*a-d* will be dispose on a separate floor mat. In an embodiment, detachment device (label) 150 may be made of a thin Mylar polymer or similarly suitable film, which will avoid adding unnecessary thickness to the floor mat.

For this embodiment, the detachment label 150 serves multiple purposes. First, it prevents the adhesive disposed beneath it from adhering to the sheet above. This provides a user with a portion of a sheet with which to grasp and remove the upper most layer. Further, the detachment label 150 may include an alphanumeric symbol 750 that can indicate either how many sheets have been used, or how many sheets are left, thus indicating when the floor mat would need to be replaced. Lastly, the detachment label 150 may indicate to a user if more than one sheet is being removed, thereby avoiding unnecessary wastage. In an embodiment, other detachment devices are also contemplated such as tabs, string, chords, or similar structures that serve to indicate individual sheets and provide a user with a device with which to grasp the sheet.

Figure 8:
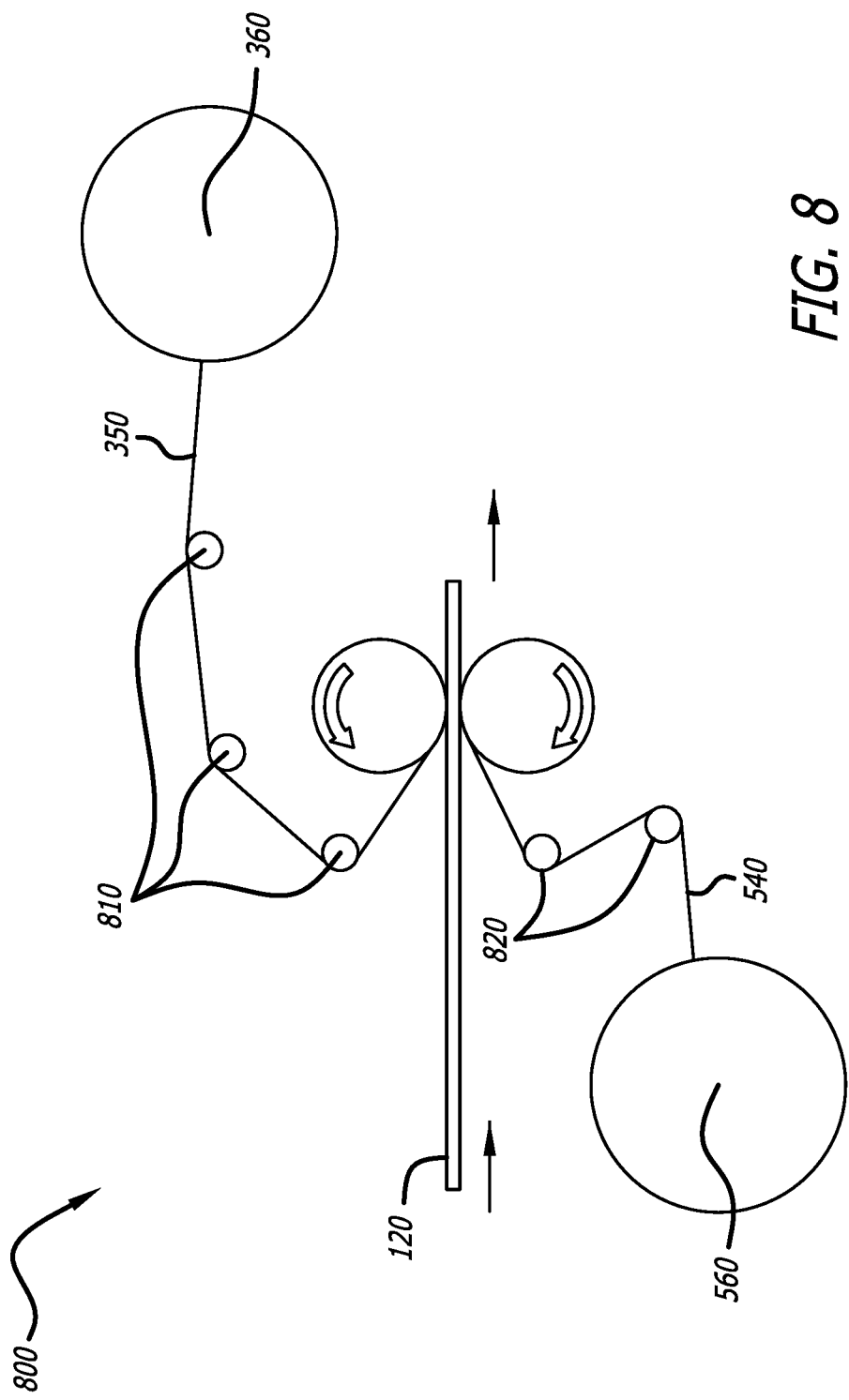
FIG. 8 is an exemplary apparatus and method of assembling a top protective liner, a plurality of upper layers, a base layer, and a backing layer to create a floor mat.

Referring to FIG. 8, an exemplary system 800 for assembling the floor mat 100, is shown. The plurality of upper layers and associated detachment devices, which are assembled on drum 620, may be removed from drum 620. The stack of the plurality of layers 120 may then have the base layer 130, backing layer 140, and top protective liner 110 applied. The top protective liner 110 may be a roll 360 of bio-renewable material, or a polymer film including a bio-renewable material 350. The film 350 may be unwound from roll 360 and fed through a series of rollers 810 and applied to the upper surface of a top most layer of the plurality of upper layers 120. While a top protective liner 110 may be made of film 350, it will be appreciated that the top protective liner 110 may also made from a film of pure synthetic polymer, such as for example LDPE, organic materials, such as for example paper, waxed paper, cloth, or any suitable material known in the art. It will be appreciated that other synthetic polymer films with similar physical and mechanical properties to LDPE may be used for the top protective liner 110 and fall within the scope of the present invention. The base layer 130 and backing layer 140 may also be applied to the plurality of upper layers 120. The roll 560 which includes the base layer 130 and backing layer 140 maybe fed through a series of rollers 820 and applied to a lower surface of the plurality of upper layers 120. It will be appreciated that the upper surface of the base layer 130 which includes the first adhesive will be applied to the lower surface of the lower most layer of the plurality of upper layers 120. Accordingly, a plurality of floor coverings 100 will be assembled. Once assembled, the floor mat 100 will be cut to an appropriate size.

In an exemplary method of use a floor mat 100, which is sized to fit either a walkway or similar area, may be adhered to the floor. First, the protective backing layer 140 may be removed and discarded, which exposes the second adhesive coating on a lower surface of the base layer. The second adhesive coating has a tack level sufficient to adhere the floor mat 100 in place. Once in place, the top protective liner 110 may be removed and discarded. It is important to note that the tack level of the second adhesive is greater than the tack level of the first adhesive. This ensures that the floor mat remains adhered to the floor when foot traffic or equipment is pulled away from plurality of upper layers. Further this ensures the floor mat remains adhered to the floor when an upper most layer of the plurality of upper layers 120 is removed. Each of the layers of the plurality of upper layers 120 have a detachment device disposed, for example, in one corner. Although it will be appreciated that other configurations and positions of detachment devices are contemplated and fall within the scope of the present invention.

As discussed herein, the overall thickness of the floor mat may be sufficient to fit below the standard clearance of a door so that a door may open and pass above the floor mat without contacting the upper most layer of the plurality of upper layers 120. As foot traffic and equipment passes over, and makes contact with the exposed upper most layer of the plurality of upper layers 120, the first adhesive traps any particulate matter. The top most layer may then be discarded. The detachment device 150 facilitates the detachment of the upper most layer by providing a portion of the layer that is not adhered to the sheet below. The user may then grasp this portion and remove the upper most layer. The detachment device 150 further includes an alphanumeric symbol which may indicate the number of layers left, or the number of layers used. Once all of the plurality of upper layers 120 have been removed, the remaining base layer 130 may be removed.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A floor mat, comprising:
a base layer; and
a plurality of upper layers positioned over the base layer;
wherein a first adhesive is disposed on (i) a portion of an upper surface of the base layer, (ii) an entirety of an upper surface of one or more upper layers of the plurality of upper layers, except at a surface of a label occupying a first location of the upper surface, for adherence to a neighboring upper layer, and (iii) an entirety of an upper surface of a topmost upper layer of the plurality of upper layers, except at a surface of a label occupying a second location of the topmost upper surface aligned with the first location, to capture contaminants, and a second adhesive having a tack level that is at least double a tack level of the first adhesive is disposed on a portion of a lower surface of the base layer, and
wherein at least each of the plurality of upper layers is formed of a coextruded polymer composition including a composite layer of polymer and bio-renewable material interposed between a first layer of polymer and a second layer of polymer.

2. The floor mat of claim 1, wherein the bio-renewable material comprises a thermoplastic starch.

3. The floor mat of claim 1, wherein the bio-renewable material comprises any one or more of a starch and a metal blend including at least one of zinc (Zn), iron (Fe), or nickel (Ni).

4. The floor mat of claim 1, wherein the first adhesive is disposed over the upper surface of each of the plurality of upper layers in its entirety except for a top surface of a detachment device including the label disposed adjacent to a corner of each of the plurality of upper layers with consecutive labels disposed immediately below that are used to facilitate removal of the topmost upper layer from an upper layer of the plurality of upper layers immediately below the topmost layer.

5. A floor mat, comprising:
a base layer including a first adhesive disposed on at least a portion of an upper surface of the base layer and a second adhesive disposed on at least a portion of a lower surface of the base layer, wherein the second adhesive has a tack level greater than the first adhesive; and
a plurality of upper layers positioned over the base layer, each of the plurality of upper layers including the first adhesive disposed over an entirety of an upper surface of each of the plurality of upper layers except at a surface of a label occupying a location of the upper surface, wherein the first adhesive disposed on a topmost upper layer of the plurality of upper layers to capture contaminants and the first adhesive disposed on one or more remaining upper layers of the plurality of upper layers to adhere to a neighboring upper layer of the plurality of upper layers;
wherein at least one of the base layer and the plurality of upper layers is formed of a coextruded polymer composition including a bio-renewable material and at least the first adhesive of the base layer is applied to adhere to a neighboring upper layer of the plurality of upper layers.

6. The floor mat of claim 5, wherein the bio-renewable material comprises a thermoplastic starch.

7. The floor mat of claim 5, wherein the bio-renewable material comprises any one or more of a starch and a metal blend including at least one of zinc (Zn), iron (Fe), or nickel (Ni).

8. The floor mat of claim 5, wherein the first adhesive is disposed over the upper surface of each of the plurality of upper layers in its entirety except for a detachment device including the label disposed adjacent to a corner of each of the plurality of upper layers with consecutive labels disposed immediately below that are used to facilitate removal of the topmost upper layer from an upper layer of the plurality of upper layers immediately below the topmost layer.

9. The floor mat of claim 8, wherein each of the plurality of upper layers includes the detachment device substantially aligned with each another.

10. The floor mat of claim 9, wherein the detachment device is a label which prevents a portion of the upper layer on which the label is disposed from adhering to an adjacent upper layer.

11. The floor mat of claim 9, wherein the detachment device includes an alphanumeric symbol.

12. The floor mat of claim 5, wherein the second adhesive has a tack level that is at least double a tack level of the first adhesive.

13. The floor mat of claim 5, further comprising:
a protective liner positioned over and aligned with the plurality of upper layers; and
a backing layer positioned under and aligned with the base layer;
wherein the protective liner covers the first adhesive disposed on the topmost upper layer of the plurality of upper layers.

14. The floor mat of claim 13, wherein the backing layer covers the second adhesive.

15. The floor mat of claim 5, wherein the coextruded polymer composition comprises a layer of resin including the bio-renewable material interposed between a first polymer layer and a second polymer layer.

16. The floor mat of claim 15, wherein the layer of resin being formed from a synthetic polymer and the bio-renewable material, and the bio-renewable materials forming less than forty percent of the resin.

17. The floor mat of claim 5, wherein each of the plurality of upper layers being part of the stack of coextruded film sheets is formed with a layer of resin including a combination of a polymer and the bio-renewable material interposed between a first polymer layer and a second polymer layer.

* * * * *